United States Patent
Anand et al.

(10) Patent No.: US 10,981,045 B1
(45) Date of Patent: Apr. 20, 2021

(54) TENNIS BALL POD

(71) Applicants: Rahul Anand, Fairfield, CT (US); Rhiya Anand, Fairfield, CT (US); Kieran Anand, Fairfield, CT (US)

(72) Inventors: Rahul Anand, Fairfield, CT (US); Rhiya Anand, Fairfield, CT (US); Kieran Anand, Fairfield, CT (US)

( * ) Notice: Subject to any disclaimer, the term of this patent is extended or adjusted under 35 U.S.C. 154(b) by 0 days.

(21) Appl. No.: 16/894,800

(22) Filed: Jun. 6, 2020

(51) Int. Cl.
  *A63B 71/00* (2006.01)
  *A63B 47/00* (2006.01)
  *B62B 3/02* (2006.01)
  *A63B 102/02* (2015.01)

(52) U.S. Cl.
  CPC .......... *A63B 71/0045* (2013.01); *A63B 47/00* (2013.01); *B62B 3/02* (2013.01); *A63B 2102/02* (2015.10); *A63B 2225/682* (2013.01); *A63B 2225/685* (2013.01); *A63B 2225/687* (2013.01); *B62B 2202/40* (2013.01)

(58) Field of Classification Search
  CPC ................ A63B 71/0045; A63B 47/00; A63B 2225/685; A63B 2225/682; A63B 2102/02; A63B 2225/687; B62B 3/02; B62B 2202/40; B60B 33/0007
  See application file for complete search history.

(56) References Cited

U.S. PATENT DOCUMENTS

| | | | |
|---|---|---|---|
| 2,088,980 A | 8/1937 | Stein | |
| 4,135,716 A * | 1/1979 | Ginsburg | A63B 61/04 473/416 |
| 4,795,179 A * | 1/1989 | Liner | A45D 44/02 280/47.35 |
| 5,014,848 A | 5/1991 | Wild et al. | |
| 5,881,875 A | 3/1999 | Beurekjian | |
| 5,881,891 A * | 3/1999 | Murphy, Jr. | A47L 13/51 211/65 |
| 6,419,246 B1 * | 7/2002 | Neal | B62B 5/0083 280/47.34 |
| 7,845,656 B2 * | 12/2010 | Thompson | B62B 3/104 280/79.5 |

(Continued)

*Primary Examiner* — Ko H Chan

(57) ABSTRACT

An illustrated view of an exemplary ball pod for holding and transporting balls, such as tennis balls, baseballs, etc. is presented. The ball pod is useful for allowing easy access to the balls and refreshments while playing or practicing a game. The ball pod is easy to transport the balls from one location to another location and is efficient in use and accessibility. Furthermore, the ball pod is useful for securely holding refreshments for the player in order to refresh or hydrate the player during the game or the practice. The ball pod may also hold other items such as various player's garments (warm-up tops, bottoms, etc.), towels, personal items (smart phones, keys, wallet), etc. The ball pod has further uses such as, but not limited to, poolside holding refreshments, personal items, towels, street clothes), bar-b-que (holding utensils, condiments, aprons, towels, items to be grilled etc. and can further operate as a mini prep area when equipped with accessory trays), hotel rooms (holding refreshments, such as champagne, ice, gifts, etc.), gyms, (basketball courtside, weight training/fitness training, coaching equipment, refreshments, etc.), field sports (holding coaches equipment, personal items, etc.), beaches (holding towels, personal items, etc.), etc.

20 Claims, 4 Drawing Sheets

(56) References Cited

U.S. PATENT DOCUMENTS

| | | | | |
|---|---|---|---|---|
| 7,866,719 B1* | 1/2011 | Lucca | .................... | A63B 47/00 |
| | | | | 294/19.2 |
| 7,997,594 B1* | 8/2011 | Mortazavi | ................. | B62B 1/26 |
| | | | | 280/47.26 |
| 8,376,376 B2* | 2/2013 | Thibault | ................. | A47L 13/58 |
| | | | | 280/79.5 |
| 9,089,210 B2* | 7/2015 | Kool | ....................... | A47B 31/04 |
| 9,220,339 B1* | 12/2015 | Chen | ....................... | A63B 47/00 |
| 10,220,288 B1* | 3/2019 | Anand | ..................... | A63B 1/00 |
| 2006/0244228 A1* | 11/2006 | Huguet | ................ | B62B 5/0006 |
| | | | | 280/47.35 |
| 2009/0295108 A1* | 12/2009 | Oku | ..................... | B62B 5/0013 |
| | | | | 280/43 |
| 2012/0073615 A1 | 3/2012 | Fletcher | | |
| 2017/0266516 A1 | 9/2017 | Askenazi et al. | | |
| 2018/0272197 A1 | 9/2018 | Askenazi et al. | | |

* cited by examiner

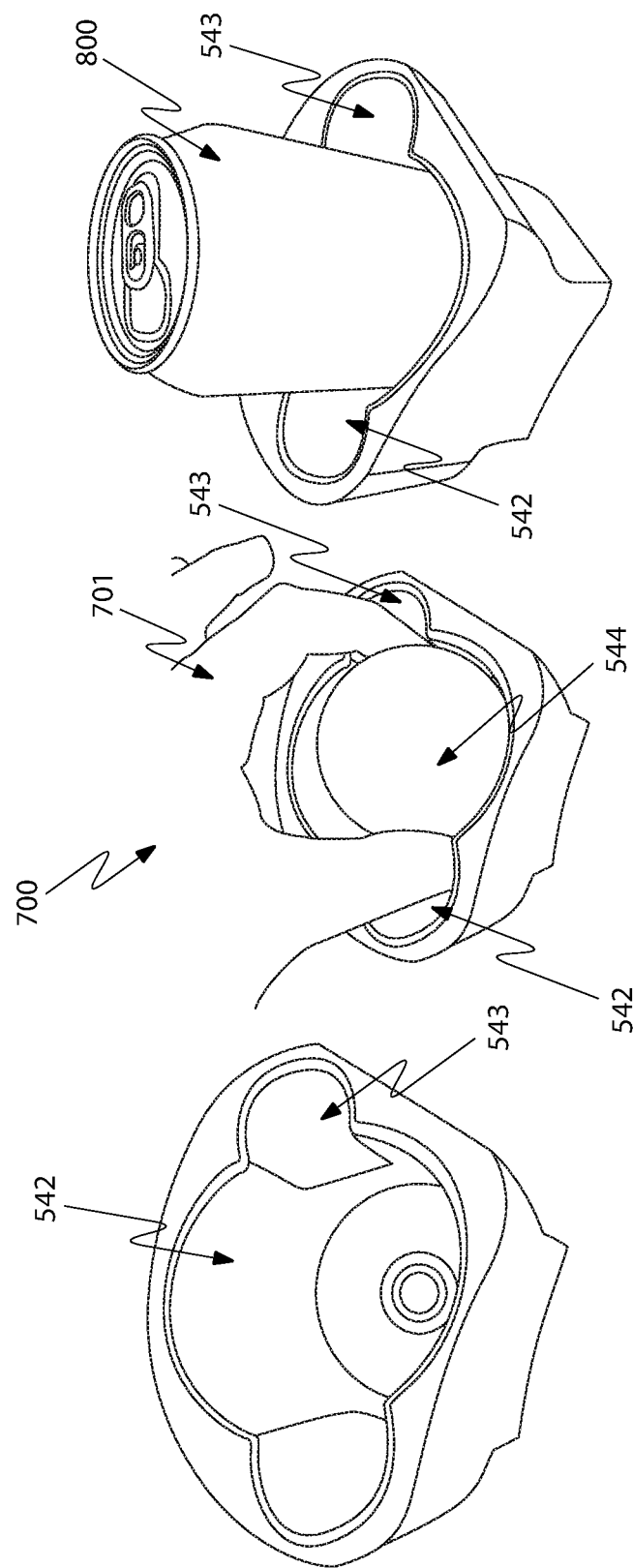

TENNIS BALL POD

FIELD OF THE INVENTION

This invention relates to pods. More particularly, it relates to an improved pod for holding and transporting tennis balls, towels, sports clothing and personal items.

BACKGROUND

A ball is a round object (usually spherical but can sometimes be ovoid) with various uses. It is used in ball games, where the play of the game follows the state of the ball as it is hit, kicked or thrown by players. Balls can also be used for simpler activities, such as catch or juggling. Balls made from hard-wearing materials are used in engineering applications to provide very low friction bearings, known as ball bearings. Black-powder weapons use stone and metal balls as projectiles.

Although many types of balls are today made from rubber, this form was unknown outside the Americas until after the voyages of Columbus. The Spanish were the first Europeans to see the bouncing rubber balls (although solid and not inflated) which were employed most notably in the Mesoamerican ballgame. Balls used in various sports in other parts of the world prior to Columbus were made from other materials such as animal bladders or skins, stuffed with various materials.

As balls are one of the most familiar spherical objects to humans, the word "ball" may be used to refer to or describe spherical or near-spherical objects.

Often times when playing sports using balls and other equipment, more than one ball is necessary to play or practice the sport. Currently, holders or carriers for balls, especially in tennis, the carrier is a bag, backpack, etc. These carriers are useful for transporting the balls and equipment, but do not hold a great number of balls, normally under five (5). Further, when accessing the balls while playing, the carrier requires being opened and then reaching in to "feel" for a ball. Also, the carriers are laying on the ground or a bench and are not able to hold refreshments and the like for the player.

Accordingly, there is a need for a device to hold balls, in particular tennis balls, that allow for easy access and recovery of the balls at a height more efficient for a player needing a ball to continue play. Furthermore, the device should also have a hold for such things as canned beverages and the like.

When the pod is used in the sport of tennis, there is also a need to hold additional equipment and personal items that the player may need. Often players keep a towel to wipe their racket's grip and themselves of the sweat generated from hard play. The towels are many times found near them in the back-court on the less hygienic ground. This device can offer a place to manage towels and keep them off the dirty, potentially germ ridden court surface.

For non-tournament play, players are often coming to the court directly from work or home and have personal items like smart phones, car keys, wallets and purses they need to put somewhere while playing. Having a place to put these items in closer proximity and control of the player would be a welcome addition.

In addition to tennis, there are many places where a sport or leisure activity is enjoyed and the participant or supervisor of the activity needs a place to store professional tools for the activity as well as the aforementioned towels and personal items during the play of the sport or during a transition from street clothes to the activity specific apparel. Examples include, but not limited to, swimming pools, gyms, court sports, weightlifting, barbeques, honeymoons, etc.

The inventor has a previously allowed and granted patent related to the instant application. The U.S. Pat. No. 10,220,288 is drawn to a "A stand for tennis balls and a towel provides a portable free-standing tripod-like structure for conveniently positioning such items as tennis balls and a towel upon a tennis court surface during a game of tennis. The stand provides a hinged construction which enables compact folding for storage when not in use." This U.S. Patent is improved upon in the instant application.

BRIEF DESCRIPTION OF THE DRAWINGS

FIG. 3A, FIG. 3B and FIG. 3C are illustrated views and used of holder of the exemplary ball pod shown in FIG. 1.

DETAILED DESCRIPTION

Figure 1:
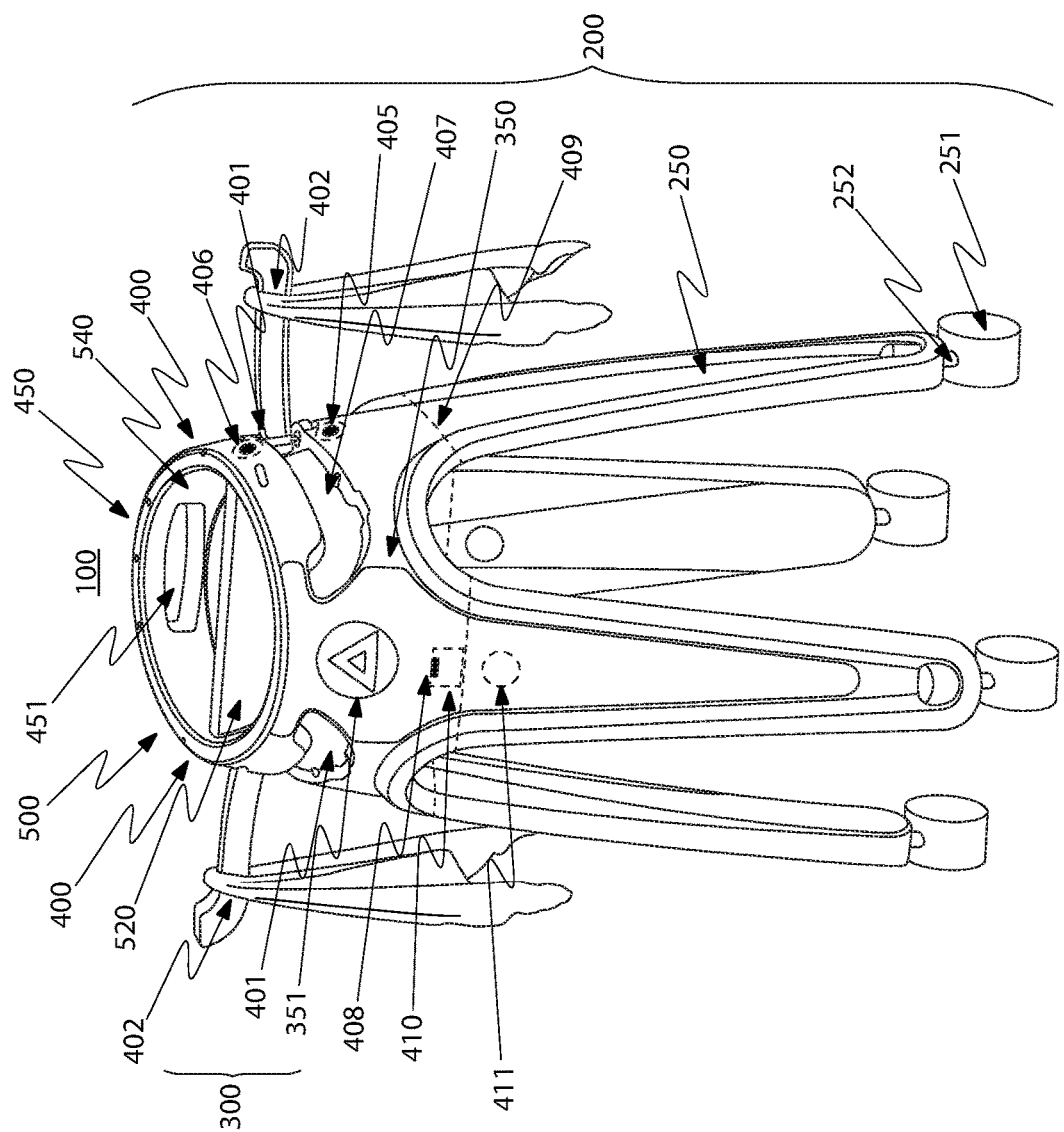
FIG. 1 is an illustrated view of an exemplary ball pod.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list.

"Above," "adhesive," "affixing," "any," "around," "both," "bottom," "by," "comprising," "consistent," "customized," "enclosing," "friction," "in," "labeled," "lower," "magnetic," "marked," "new," "nominal," "not," "of," "other," "outside," "outwardly," "particular," "permanently," "preventing," "raised," "respectively," "reversibly," "round," "square," "substantial," "supporting," "surrounded," "surrounding," "threaded," "to," "top," "using," "wherein," "with," or other such descriptors herein are used in their normal yes-or-no sense, not as terms of degree, unless context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Referring to FIG. 1, an illustrated view of an exemplary ball pod 100 for holding and transporting balls, such as tennis balls, baseballs, etc. is presented. The ball pod 100 is useful for allowing easy access to the balls and refreshments while playing or practicing a game. The ball pod 100 is easy to transport the balls from one location to another location and is efficient in use and accessibility. Furthermore, the ball pod 100 is useful for securely holding refreshments for the player in order to refresh or hydrate the player during the game or the practice. The ball pod 100 may also hold other items such as various player's garments (warm-up tops, bottoms, etc.), towels, personal items (smart phones, keys, wallet), etc.

The ball pod 100 has further uses such as, but not limited to, poolside holding refreshments, personal items, towels, street clothes), bar-b-que (holding utensils, condiments, aprons, towels, items to be grilled etc. and can further operate as a mini prep area when equipped with accessory trays), hotel rooms (holding refreshments, such as champagne, ice, gifts, etc.), gyms, (basketball courtside, weight training/fitness training, coaching equipment, refreshments, etc.), field sports (holding coaching equipment, personal items, etc.), beaches (holding towels, personal items, etc.), etc.

The ball pod 100 has a body 200. The body 200 has a plurality of legs 250 and a top portion 300. The body 200 of the ball pod 100 is preferably made of a medium-density polyethylene (MDPE) material, however other materials are hereby contemplated, including, but not limited to, high-density polyethylene (HDPE), low-density polyethylene (LDPE), poly-vinyl chloride (PVC), plastic, etc. The body 200 is preferably made of a single cast mold, however it is hereby contemplated that the body 200 may have multiple molds that can be coupled at time of use. The multiple molded body 200 is efficient for transporting, shipping, etc.

The plurality of legs 250 are preferably four (4) in number, however other numbers of legs are hereby contemplated, including, but not limited to, three (3), six (6), etc. Each of the plurality of legs 250 are preferably identical, thus allowing for a single-mold mass production of the legs and easy replacement should one become damaged or unusable for any reason. However, one of skill in the art may device the plurality of legs 250 to not be identical as determined by the person of skill in the art.

When the pod 100 is formed from more than one mold, each of the legs 250 are coupled to the top portion 300 at a part line 409. A latch 408 is further coupled to recessed portion 410 of the top portion 300 and the part line 409 to ease in detaching the legs 250 from the top portion 300.

Further, optionally and/or additionally, each of the legs 250 may have a fill port 411. The fill port 411 provides an entry and exit port for inserting a weighted material for providing stability to the pod 100 during inclement weather. The weighted material is preferably sand, however other weighting materials are hereby contemplated, including, but not limited to, water, pea gravel, etc.

The ball pod is preferably thirty-eight (38) inches in height, however other heights are hereby contemplated. Including but not limited to, thirty-four (34) inches, forty (40) inches, etc. The ball pod 100 is preferably twenty-six and one-half (26.5) inches in width, however other widths are hereby contemplated, including, but not limited to, twenty-five (25) inches, twenty-eight (28) inches, etc.

Optionally and/or additionally, each of the plurality of legs 250 has a caster 251. The caster 251 is preferably made of a thermoplastic material, however other materials are hereby contemplated, including, but not limited to, plastic, nylon, etc. Each of the casters 251 are coupled to one of the plurality of legs 250 by a threaded stem 252. The threated stem 252 preferably has a height of one (1) inch, however other heights are hereby contemplated, including but not limited to, three-eights (3/8) inch, one and one-fourth (1.25) inch, etc. The threaded stem 252 has diameter of three-eights (3/8) inch, however other diameters are hereby contemplated, including, but not limited to, one-half (0.5) inch, one (1) inch, etc. The threaded stem 252 preferably has sixteen (16) threads per inch (TPI) however other TPIs are hereby contemplated, including, but not limited to, twenty (20), twelve (12), etc.

The top portion 300 has a front 350, two (2) sides 400, a back 450 and an inside 500. The front 350 preferably has a logo 351. The logo 351 is preferably a trademark of a company however other types of logos are hereby contemplated, including, but not limited to, symbols, numbers, objects, initials, patterns, etc.

Each of the sides 400 have an arm rest 401 for holding an arm 402. The arm 402 is preferably for holding a towel, however other uses of the arm 402 are hereby contemplated. The arm 402 when not in use, is folded into and securely coupled to the arm rest 401. When the arm 402 is in use, the arm rest 401 is recessed from the side 400. Each of the arms 402 may be have a detent 405 such that the arms 402 "snap" in an open position and/or a closed position. Each of the arms 402 has one or more detents 405 that are useful in snapping the arm 402 into position, whether open or closed. The detents 405 are received by a receiving connector 406 in a recessed area 407 for receiving the arm 402. The arm 402 and the arm rest 401 nest to become self-contained and can stored securely in the recessed area 407 of the side 400 for storage. This nest of the arm 402 and the arm rest 401 allow for the ball pod 100 to be stacked. The stacking of the ball pods 100 can occur with or without the legs 250 having the optional and/or additional casters 251.

The back 450 has an opening 451. The opening 451 is preferably hollow. The opening 451 is configured to receive a hand of a person for lifting and transporting the ball pod 100. Under windy or other conditions, the opening 451 may have sand, rocks, water, etc. placed into the opening 451 to provide stability during trying conditions.

The ball pod 100 has smooth areas on the top portion 300 and each of the plurality of legs 250. This smooth area is useful for acceptance of ownership identification decals (such as, name of school, club, resorts, municipalities, etc.) and advertising (such as, tournament sponsors, etc.).

The inside 500 has a ball container 520 and a holder area 540. The ball container 520 and the holder area 540 are shown in more detail in FIG. 2.

Figure 2:
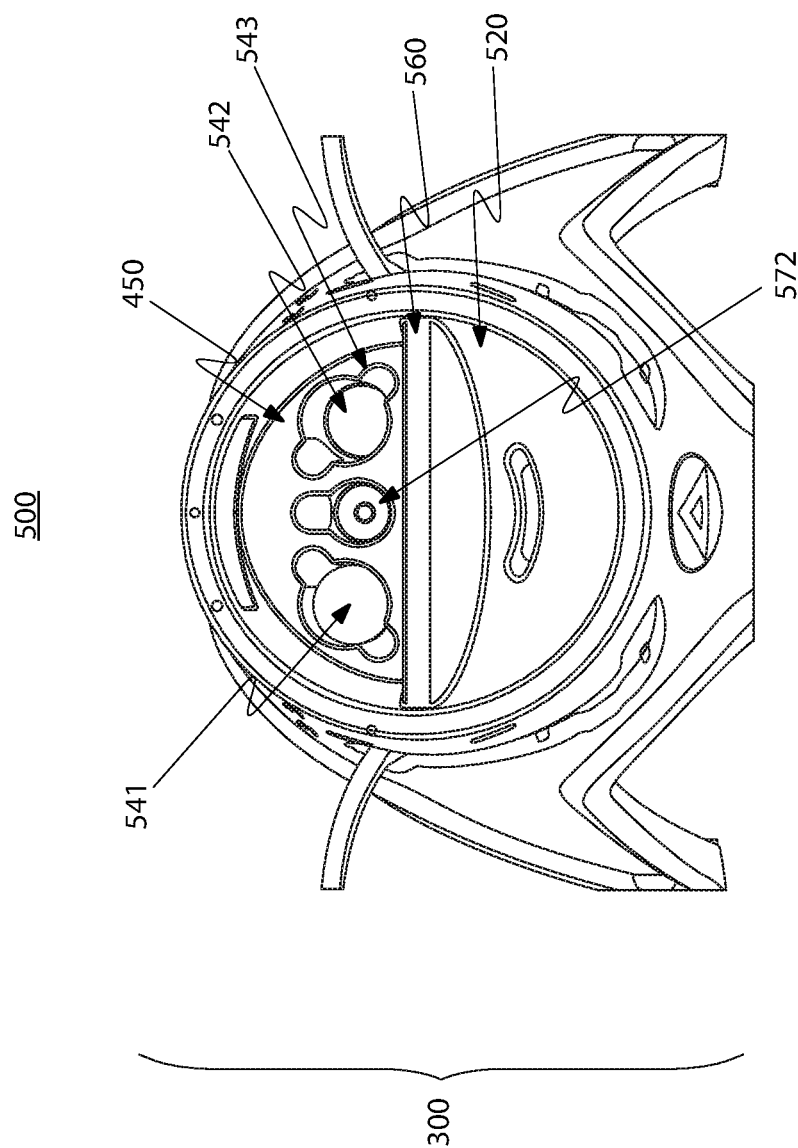
FIG. 2 is an illustrated top view of the exemplary ball pod shown in FIG. 1.

FIG. 2 is an illustrated inside 500 of the top portion 300 of the exemplary ball pod 100 shown in FIG. 1.

The inside 500 of the top portion 300 of the ball pod 100 has the ball container 520 and the holder area 540. A wall 560 is configured between the ball container 520 and the holder area 540.

The ball container 520 is preferably hollow. The ball container 520 preferably can hold twenty-two (22) tennis balls, however other number of tennis balls are hereby contemplated, including, but not limited to, twenty (20), twenty-three (23), etc.

The holder area 540 has a plurality of holders 541. The holders 541 have a middle portion 542 and a plurality of finger holes 543.

Further, optionally and/or additionally, a scoring post 572 is configured in one of the holders 541 preferably being able to hold a standard three-eights (3/8) inch diameter scoring post. The placement of a standard scoring post 572 allows for the ball pod 100 to be deployed at the center of the court on the side to hold the player's items, such as refreshments, towels, etc.

FIG. 3A, FIG. 3B, and FIG. 3C are close up illustrated views of the holder 541 and uses of the holder 541. The finger holes 543, when the middle portion 542 has a ball 554 of FIG. 3B are configured to allow a finger 701 of a hand 700 to retrieve the ball 554 efficiently. The holders 541 may also have a can refreshment 800. The can refreshment 800 is securely and removably coupled in the holder 541, see FIG. 3C.

Figure 4B:
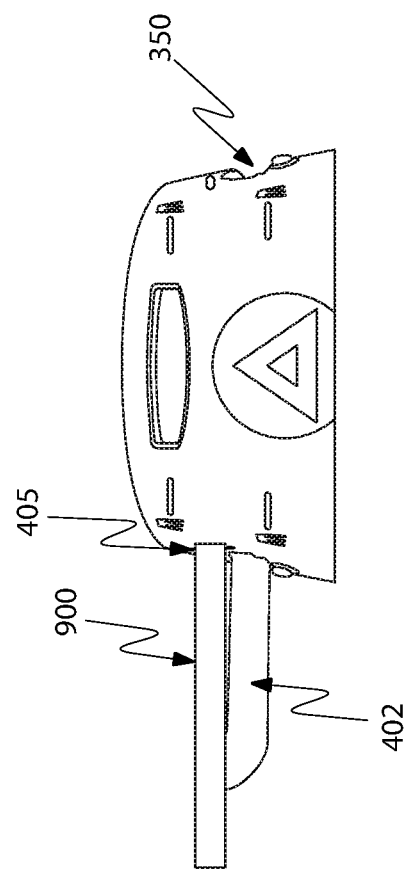
FIG. 4A and FIG. 4B are illustrated side view of a top portion of the exemplary ball pod shown in FIG. 1.
Figure 4A:
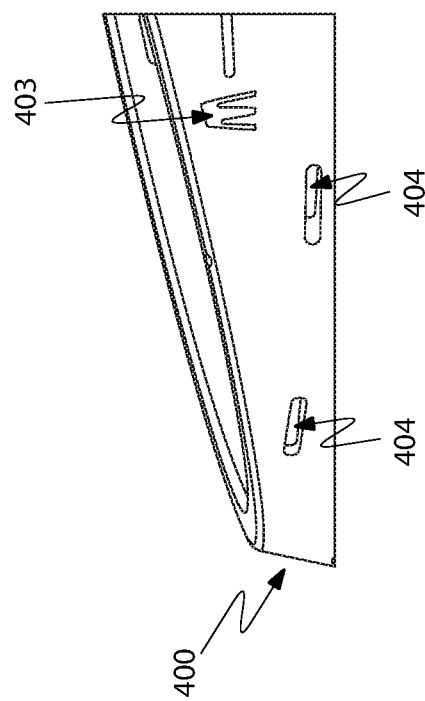

Referring now to FIG. 4A and FIG. 4B, FIG. 4A is an illustrated side 400 view of the top portion 300 of the ball pod 100 shown in FIG. 1. FIG. 4B is the front 350 of the top portion 300 of the ball pod 100 shown in FIG. 1.

The side 400 of the top portion 300 has one or more net gauges 403 and one or more slots 404. The one or more slots 404 are configured to have a board 900 of FIG. 4B, coupled to the one or more slots 404. The arm 402 is configured to be removed from the arm rest 401 and the board 900 is coupled to the arm 402 for support.

The net gauges 403 are configured to aid in securing a predetermined height to accommodate a need of the player for efficient and effective use of the ball pod 100, to show the height of the ball pod with or without casters 251.

In the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The features described with respect to one embodiment may be applied to other embodiments or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A ball pod for holding and transporting tennis balls, the ball pod comprising:
   a body, the body comprising:
     a plurality of legs, each of the legs being extended from a top portion;
     the top portion, the top portion comprising:
       a front, the front having a logo;
       two (2) sides, each of the sides having an arm rest and an arm, wherein when the arm is not in use the arm rest is configured to receive the arm;
       a back, the back having an opening; and
       an inside, the inside having a ball container and a holder area.

2. The ball pod of claim 1, wherein the ball pod further comprising a plurality of casters, wherein each of the plurality of casters being securely and removably coupled to one of the plurality of legs by a threaded stem.

3. The ball pod of claim 2, wherein the threaded stem having a length being one (1) inch.

4. The ball pod of claim 2, wherein the threaded stem having a diameter being three-eights (3/8) inch.

5. The ball pod of claim 2, wherein the threaded stem having a thread per inch being sixteen (16).

6. The ball pod of claim 2, wherein the caster being made of a thermoplastic material.

7. The ball pod of claim 1, wherein body being made of a medium-density polyethylene (MDPE) material.

8. The ball pod of claim 1, wherein the body being made by a single cast mold.

9. The ball pod of claim 1, wherein the ball pod having a height being thirty-eight (38) inches.

10. The ball pod of claim 1, wherein the ball pod having a width being twenty-six and one-half (26.5) inches.

11. The ball pod of claim 1, wherein the plurality of legs having a number being four (4).

12. The ball pod of claim 1, wherein the logo being a trademark of a company.

13. The ball pod of claim 1, wherein the ball pod being mobile.

14. The ball pod of claim 1, wherein the ball container having a capacity being twenty-two (22) tennis balls.

15. The ball pod of claim 1, wherein the holder area further comprising a plurality of holders.

16. The ball pod of claim 15, wherein the holders having a middle portion and a plurality of finger holes.

17. The ball pod of claim 15, wherein the holders being for holding a tennis ball.

18. The ball pod of claim 15, wherein the holders being for holding a canned refreshment.

19. The ball pod of claim 1, wherein the side further comprising one or more slots, wherein the one or more slots being configured to securely couple to a board, and wherein the arm being a support for the board.

20. The ball pod of claim 1, wherein the side further comprising one or more net gauges.

* * * * *